(12) United States Patent
Salazar Cardozo

(10) Patent No.: US 7,301,475 B2
(45) Date of Patent: Nov. 27, 2007

(54) SYSTEMS AND METHODS FOR UTILITY METER DATA COLLECTION

(75) Inventor: Ruben E. Salazar Cardozo, Alpharetta, GA (US)

(73) Assignee: Callnet Innovations, Inc., Alpharetta, GA (US)

( * ) Notice: Subject to any disclaimer, the term of this patent is extended or adjusted under 35 U.S.C. 154(b) by 99 days.

(21) Appl. No.: 11/110,075

(22) Filed: Apr. 20, 2005

(65) Prior Publication Data

US 2006/0202855 A1   Sep. 14, 2006

Related U.S. Application Data

(60) Provisional application No. 60/660,689, filed on Mar. 10, 2005.

(51) Int. Cl.
*G08B 25/00* (2006.01)
(52) U.S. Cl. .................. 340/870.02; 705/412
(58) Field of Classification Search ........... 340/870.02, 340/870.03, 870.16, 870.15; 705/412
See application file for complete search history.

(56) References Cited

U.S. PATENT DOCUMENTS 6,657,552 B2 *  12/2003  Belski et al. ........... 340/870.02

* cited by examiner

*Primary Examiner*—Albert K. Wong
(74) *Attorney, Agent, or Firm*—Kilpatrick Stockton LLP; Brenda O. Holmes

(57) ABSTRACT

Systems and methods for utility meter data collection on distributed metering systems. One aspect of the present invention provides quantity-interval or count-step based collection, reading, recording, and/or transmission of consumption data for distributed utility meter reading systems.

41 Claims, 6 Drawing Sheets

| 402 METER ID | 404 ΔTIME |
|---|---|

| 501 ΔTime1 | | |
|---|---|---|
| 502 ΔTime2 | 512 ΔTime2 | |
| ⋮ | 513 ΔTime3 | 523 ΔTime3 |
| 503 ΔTime$_n$ | ⋮ | 524 ΔTime4 |
| | 514 ΔTime$_{n+1}$ | ⋮ |
| | | 525 ΔTime$_{n+2}$ |

SYSTEMS AND METHODS FOR UTILITY METER DATA COLLECTION

CROSS-REFERENCE TO RELATED APPLICATION

The present application claims the benefit of provisional application Ser. No. 60/660,689 filed Mar. 10, 2005.

FIELD OF THE INVENTION

The invention generally relates to systems and methods for utility meter data collection. More specifically, the invention relates to data collection on distributed metering systems.

BACKGROUND OF THE INVENTION

Commodities such as gas, electric, and water are provided by utility companies around the world to households, businesses, and other consumers. Utility companies typically charge the consumers based on the quantity of the commodity that the consumer uses or consumes. Thus, utility companies commonly gauge consumption using meters and bill their customers accordingly. Traditionally, at the end of a reporting period, a utility employee would physically inspect and record each customer's meter readout dials, which reflect usage. More recently, many utility companies have deployed automatic meter reading systems that can automatically capture consumption data from the field. In many cases, adapter modules are fitted to existing meters to provide remote data collection capability. The modules typically collect the data and transmit it over wire and/or wireless communication methods so that the data is ultimately received by the utility company.

One of the primary functions of a utility data collection network is the ability to capture data for the purpose of establishing patterns of consumption. The data is used to determine not only how much the consumer is using, but when the user is consuming it. Collecting data for this purpose has been accomplished by frequently collecting the usage data and time stamping the usage data to associate it with a particular time. When done very often, this type of data collection is typically known as interval data collection. Interval data collection is generally based on set time intervals or sampling periods, i.e., data is recorded for set intervals of time. For example, many systems record the amount of energy consumed every 2.5 minutes. Transmission of the information also typically happens on a frequent basis, most often an integer number of times the sampling period, e.g., every 5 minutes (which is 2 times the 2.5 minute sampling period).

Recording and transmitting usage data at regular time intervals must be done frequently to provide enough information to reconstruct the consumer's usage pattern and often involves transmitting highly redundant information. For example, these systems will send data even if there is no consumption activity. This has serious consequences on battery-operated devices, creates RF traffic with potential for collisions and loss of data or reduction of performance, increases the amount of data to be transmitted, and requires significant amounts of processing power and memory space for data storage, post-processing and archiving.

Time-interval based utility data collection methods that use radio-frequency (RF) transmission also typically require various techniques to avoid data collision. Transmission time is generally randomized in each communication device to avoid collisions that may result if, for example, many modules resumed operation after a power outage and attempted to transmit at the same time. To randomize transmission time, separate randomizing modules are often implemented at each meter. Data corresponding to the energy consumed during a given time period is generally transmitted at some random point during a future time period. However, since it is usually desired that the data be associated with a specific and precise time period to show when the information was sampled from the meter, additional information has to be conveyed with the usage data identifying the difference between data capture time and data transmission time. Moreover, additional processing is usually required to calculate the time boundaries from the transmitted data.

SUMMARY OF THE INVENTION

The present invention comprises various systems and methods for utility meter data collection on distributed metering systems, such as that shown in U.S. Pat. No. 6,628,699 (the disclosure of which is incorporated herein by reference). Many of the embodiments of the present invention avoid many of the problems of prior art time-interval based data collection, recording and transmission techniques by providing quantity-interval or count-step based techniques.

One aspect of the present invention is a collector having a receiver that receives data transmitted by sensors configured to store and/or send an elapsed time between successive measurements of a predetermined quantity of a consumable commodity. Each sensor may send the elapsed time to the collector for each measurement of the predetermined quantity or at intervals otherwise based on the predetermined quantity. The sensors may send the data in a variety of ways including by wireless or wire-based communication techniques. For example, the data could be transmitted by power line carrier signal, by RF signal, by modem, over telephone lines, over wide area network lines, over local area network lines, over Wi-Fi wireless local area networks, or over wireless wide area networks (WWANs). The invention is not limited to any particular method or type of data communication.

Another aspect of the present invention is a data collection system for the collection of data from a plurality of commodity meters having telemetry devices and collection devices. Each of the telemetry devices is associated with a meter and has a sensor to successively measure a predetermined amount of a parameter from the meter, a timer to measure the elapsed time between each successive measurement of the predetermined amount of said parameter, a first memory configured to store the elapsed times, and a transmitter for transmitting a packet of the stored elapsed times. The packet will typically include an address unique to the telemetry device. The collection devices may be located remotely from the telemetry devices and receive the signals.

Another aspect of the present invention is a radio communication network of remote data generating stations. Each of the remote stations has a means for generating data for transmission, a control means for modulating the data for transmission on a radio frequency carrier and arranged to form the data into a packet of data and to transmit the data upon each successive measurement of a predetermined amount of a metered parameter.

Another aspect of the present invention is a method of collecting data related to a metered commodity that involves successively measuring a predetermined amount of the metered commodity, measuring the elapsed time between each successive measurement of the predetermined amount of the metered commodity and storing the elapsed time. The stored elapsed time may also be transmitted by wireless or other type of signal to a collection device. This method may also involve storing elapsed times in the telemetry device or extracting and analyzing a series of elapsed times to generate a rate of use of the metered commodity.

Another aspect includes a method of collecting utility meter data by monitoring usage of a commodity, recording data at set quantity intervals, and storing the data at the utility meter.

Another aspect of the present invention is a utility meter data collection system having a meter reading device capable of recording data at intervals based at least in part on the quantity of the utility that is consumed and sending the data to a concentrator, and a concentrator for collecting data transmitted.

Another aspect of the present invention is a method of constructing a consumer commodity consumption profile that involves recording data at set quantity intervals at a utility meter, storing the data in a computer readable format, and processing the data to construct a consumer commodity consumption profile.

BRIEF DESCRIPTION OF THE DRAWINGS

These and other features, aspects, and advantages of the present invention are better understood when the following Detailed Description is read with reference to the accompanying drawings, wherein:

FIG. 4 illustrates an exemplary packet of data according to one embodiment of the present invention;

FIG. 5 illustrates packets of data transmitted according to one embodiment of the present invention;

DETAILED DESCRIPTION OF SPECIFIC EMBODIMENTS

Introduction

The invention uses quantity-based, rather than time-based, intervals for meter usage data collection, reading, recording, and/or transmitting. The functions are based on a set quantity interval (or count step interval) of the consumable commodity provided by a provider, especially a utility company. For example, the usage may be monitored to determine when each increment of a set quantity is used. Sensors may be used to read and/or transmit an elapsed time between these successive intervals or increments. As an example, for electrical utility systems, the quantity or count step interval could be 1 kilowatt-hour. Each time the user consumes an additional 1 kilowatt-hour, data may be recorded and/or transmitted to a collection system.

System Overview

Figure 1:
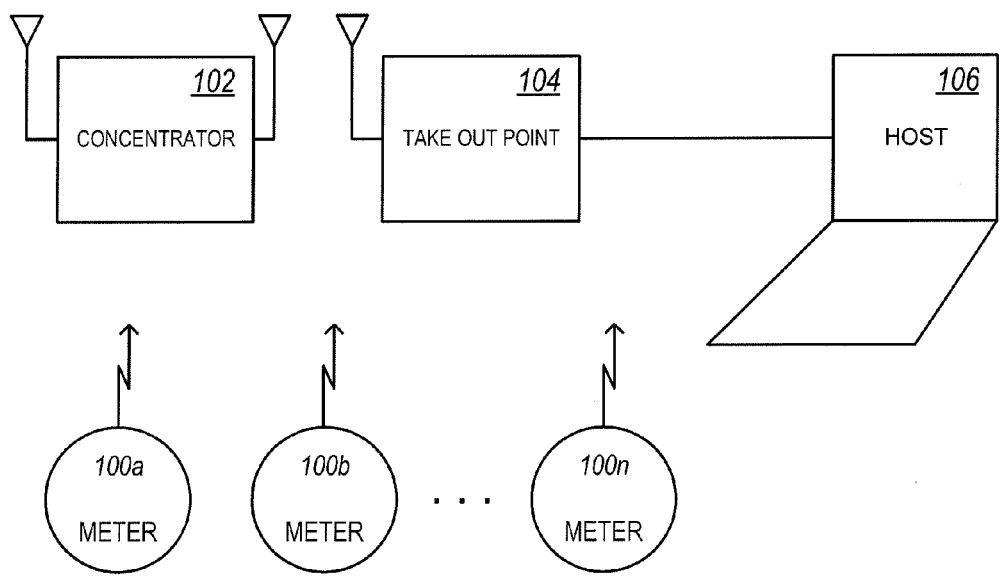
FIG. 1 illustrates a utility meter monitoring system in which the present invention may be utilized.

FIG. 1 illustrates a simplistic utility meter monitoring system in which the present invention may be utilized. The present invention is illustrated simplistically herein for ease of understanding. Of course, it is specifically contemplated that the present invention can be used in a more complex meter reading system, such as those described in U.S. Pat. Nos. 6,628,699; 6,617,978; 6,424,270; and 6,195,018, the disclosures of which are all incorporated herein by reference. Data is collected from utility meters 100*a-n* and eventually stored and used at host 106. The host 106 will typically use the usage data to generate statistics and consumer bills. The accuracy of the statistics and billing statements generated depends upon the level of detail provided by the transmitted usage data.

It should be noted that although many of the examples presented involve transmission of data based on a quantity interval or count step interval, the invention is not limited to meter reading devices and systems that transmit data. Certain embodiments of the present invention relate to data capture, data reading, data recording, and data transmission separately or in various combinations. In some embodiments, these functions will be related and in others, certain functions may not be involved at all. For example, in many embodiments data capture will be triggered by the occurrence of a count step, while data transmission will not be triggered by the occurrence of a count step. As further example, there are many benefits to simply storing data in the meter in count step interval format. Such data may be compressed and processed for billing, diagnostics, and other purposes. This time-insensitive data has many advantages over time-interval based data, as described herein, that may be realized in systems that do not transmit data. For example, a field agent can go every month to the meter and download the data or processing results, such as a count interval profile. In addition, embodiments of the invention that do relate to transmission of data are not limited to any particular type or method of transmission. Specifically, those embodiments are not limited to wireless or RF transmission.

Data is typically collected from a meter by an interface or meter-reading device, such as a disc reader. A disc-reader records information from a meter's spinning disc. The disc is typically fitted with a mark and an optical system on the interface is used to read the mark to count the number of disc revolutions. This information is typically stored in some type of accumulator. Alternatively, the meter data may be collected via more intelligent means that communicates with the meter to request and receive information. These and other types of meter-reading devices are well known in the art.

Utility meters 100*a-n* are each fitted with an interface that records and transmits data related to the consumer's consumption of the commodity. For example, one utility meter 100*a* may measure electricity usage at a household. In some prior art systems, the meter 100*a* would have a component or module that, at set time intervals, recorded the measured electricity usage and sent the data to a concentrator 102. The methods and systems of the present invention read, record and/or transmit usage data based on quantity intervals rather than the expiration of a set interval of time. In other words, the occurrence of the read, record, and/or transmit functions is based on determinations that a set quantity of the commodity has been consumed rather than a determination that a set period of time has expired.

Returning to FIG. 1, a concentrator 102 collects usage data from one or many utility meters 100*a-n*, which are typically located geographically close to the concentrator 102. The data may be transmitted from the utility meter in a variety of ways including by wireless or wire-based communication techniques, or can be collected manually by a field agent. For example, the data can be transmitted by power line carrier signal, by RF signal, by modem, over telephone lines, over wide area network lines, over local area network lines, over Wi-Fi wireless local area networks, or over wireless wide area networks (WWANs). The invention is not limited to any particular method or type of data communication.

The takeout point 104 collects data from the concentrator 102 and other concentrators (not shown). This data can then be passed on to a host 106 where it may be stored and used for billing and statistical purposes.

Packet Structure

Figure 2:
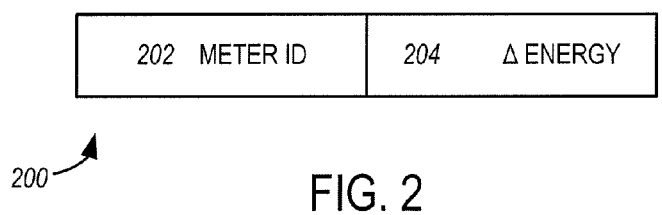
FIG. 2 illustrates an exemplary prior art packet of data.
Figure 3:
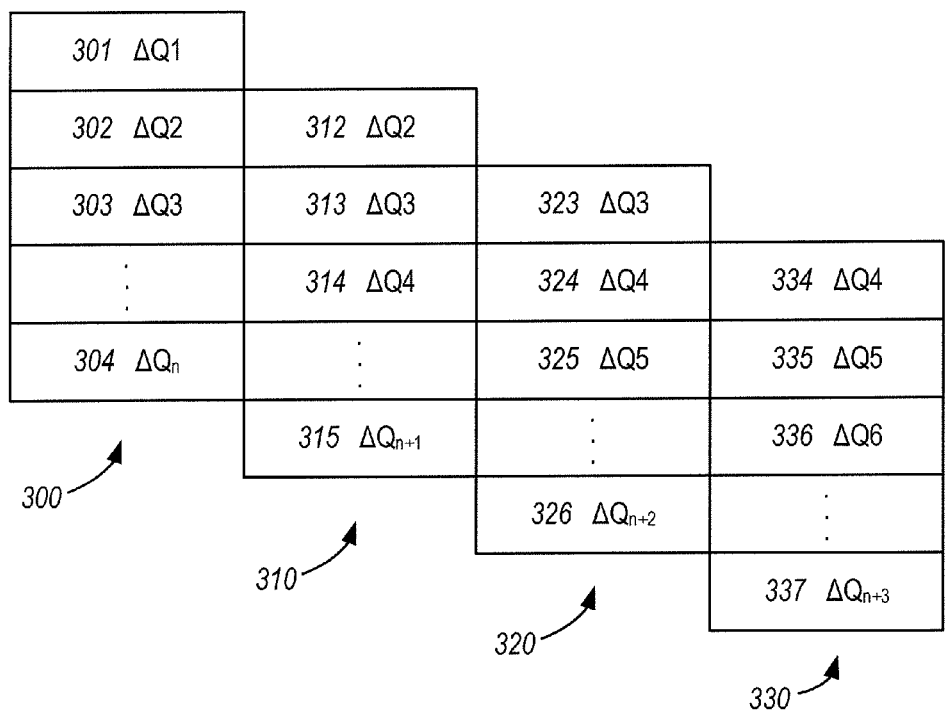
FIG. 3 illustrates exemplary prior art packets of data.

FIGS. 2 and 3 illustrate exemplary prior art packets of data. Such data structures typically include meter identification data 202 and data about the amount of utility consumed during a set period of time 204. In addition, data is typically transmitted about the current total absolute value of the utility consumed. For simplicity of description and example, references to the absolute value of the utility consumed are omitted from the examples below.

The amount of utility consumed during a set period of time 204 typically reflects the amount of utility consumed from the start of a set time period until the end of the set time period, an interval that may be referred to as a fixed delta T. FIG. 3 illustrates a series of four successive packets of time-interval based data 300, 310, 320, 330 in a stream of usage data. Such a stream of packets may have been found in a time-increment based prior art data collection system. Each packet of data 300, 310, 320, 330 contains data about the current or most recent time increment as well as data about a set number of prior time periods. For example, the first packet 300 includes recent use data 304 and historical use data 301, 302, 303 for the n−1 previous time intervals. Thus, each packet 300, 310, 320, 330 contains usage data about n time intervals. For example, if n=18, then each packet 300, 310, 320, 330 will contain information about 18 time intervals, which includes the present interval and the seventeen prior time intervals.

For each time interval, data is transmitted about the quantity of the commodity offered by the utility consumed during that time interval. For example, in the first packet, each data element 301, 302, 303, 304 contains data about the change in quantity consumed during a fixed period of time. For example, if the fixed period of time is 2.5 minutes and n=18, consumption data will be transmitted for each of the last 18 periods, where each period has a length of 2.5 minutes. As a more specific example, a packet might contain the following information about usage during the 18 most recent 2.5 minute-increments from earliest to most recent: 0, 3, 0, 1, 1, 0, 0, 2, 0, 4, 0, 0, 0, 0, 1, 0, 2, 0. This packet shows that in the most recent increment 0 units of the commodity were consumed, in the second most recent increment 2 units of commodity were consumed, in the third most recent increment 0 units were consumed, etc. The next packet would typically include data about one (sometimes more) new increment and leave off the data about the oldest increment in the first packet (sometimes more than one). In this example, the new packet might contain the following data 3, 0, 1, 1, 0, 0, 2, 0, 4, 0, 0, 0, 0, 1, 0, 2, 0, 3, with the value 3 representing the amount of consumable consumed during the most recent time increment. The following table illustrates this example:

TABLE 1

|  | $\Delta Q\ 1$ | $\Delta Q\ 2$ | $\Delta Q\ 3$ | $\Delta Q\ 4$ | $\Delta Q\ 5$ | $\Delta Q\ 6$ | $\Delta Q\ 7$ | $\Delta Q\ 8$ | $\Delta Q\ 9$ |
|---|---|---|---|---|---|---|---|---|---|
| Packet 1 | 0 | 3 | 0 | 1 | 1 | 0 | 0 | 2 | 0 |
| Packet 2 | 3 | 0 | 1 | 1 | 0 | 0 | 2 | 0 |  |

TABLE 1-continued

|  | $\Delta Q\ 10$ | $\Delta Q\ 11$ | $\Delta Q\ 12$ | $\Delta Q\ 13$ | $\Delta Q\ 14$ | $\Delta Q\ 15$ | $\Delta Q\ 16$ | $\Delta Q\ 17$ | $\Delta Q\ 18$ | $\Delta Q\ 19$ |
|---|---|---|---|---|---|---|---|---|---|---|
| Packet 1 | 3 | 0 | 0 | 0 | 0 | 1 | 0 | 2 | 0 |  |
| Packet 2 | 3 | 0 | 0 | 0 | 0 | 1 | 0 | 2 | 0 | 3 |

In FIG. 3, each packet contains information about the most recent time interval 304, 315, 326, 337 as well as data about previous time intervals 301, 302, 303, 312, 313, 314, 323, 324, 325, 334, 335, 336. The historical data provides redundancy and protects against data loss in the event that some of the packets are not received by the intended recipient.

In embodiments of the present invention, for a given constant quantity or count step, the device will be activated to read, record, and/or transmit only when the specific count step or quantity-interval has been reached. For example, for electric energy this can be one kilowatt-hour, for volume this can be a cubic foot or a gallon, for generic commodities it could simply be pulses. Any suitable measure of quantity can be used. According to this approach, the quantity-interval or count step will be constant, but the time at which it occurs will be variable.

FIGS. 4 and 5 illustrate exemplary packets of data transmitted according to one embodiment of the present invention. One of the advantages of some embodiments of the present invention is that the quantity-increment data collection techniques and systems may be used with the data structure of prior art time-increment based systems. Thus, the data collection of existing systems may be converted with minimal disturbance to the system components. For simplicity of description and example, references to the absolute value of the utility consumed, which may be included in the data structure, are omitted from the examples below.

FIG. 4 illustrates an exemplary packet of data according to one embodiment of the present invention. It includes meter identification data 402 and data about the amount of time 404 that elapsed while a set quantity of commodity offered by the utility company is consumed.

FIG. 5 illustrates packets of data transmitted according to one embodiment of the present invention. For a set quantity interval, data is transmitted about the change in time that elapsed while the quantity was consumed. Each packet 500, 510, 520 contains data about the time elapsed while the most recent quantity was consumed and information about recent historical consumption during prior quantity intervals. For example, in the first packet, each data element 501, 502, 503 contains data about the change in time that elapsed while a fixed quantity of the commodity was consumed. For example, if the fixed commodity is one Kilowatt-hour and the number of quantity increments n=18, data will be transmitted for each of the last eighteen kilowatt-hours that were consumed. As a more specific example, a packet might contain the following information about the 18 most recent kilowatt-hours consumed: 20, 10, 13, 5, 12, 12, 12, 14, 22, 20, 1, 1, 1, 1, 1, 12, 14, 26. This packet shows that the most recent kilowatt-hour was consumed in 26 minutes, the second most recent kilowatt-hour was consumed in 14 minutes, the third most recent kilowatt-hour was consumed in 12 minutes, etc.

The use of minutes as a measure of time is for illustrative purposes and is not meant to limit the scope of the invention. Other measures of time can be used. Alternatively, other embodiments of the present invention can store and/or transmit other information in addition to or instead of the information about the change in time that occurred while the set quantity interval was consumed. For example, in one embodiment a simple marker is stored and/or sent to notify that the quantity interval has been consumed and no time change information is provided. In another embodiment, for each quantity interval a reference to the time of day is stored and/or sent instead of or in addition to information about the change in time that occurred while the set quantity interval was consumed.

In the embodiment presently being described, however, information about the change in time is provided for each of the 18 quantity intervals in each packet. The next packet can contain redundant information to prevent data loss that might occur through missed packet reception. The next packet can include consumption time data about one (sometimes more) new quantity increments and leave off the data about the oldest quantity increment in the first packet (sometimes more than one). In this example, the new packet contains the following data 10, 13, 5, 12, 12, 12, 14, 22, 1, 1, 1, 1, 1, 1, 12, 14, 26, 23 with the value 23 representing the time change during the consumption of the most recent quantity increment. The following table illustrates this example:

TABLE 2

| | ΔT 1 | ΔT 2 | ΔT 3 | ΔT 4 | ΔT 5 | ΔT 6 | ΔT 7 | ΔT 8 | ΔT 9 | ΔT 10 |
|---|---|---|---|---|---|---|---|---|---|---|
| Packet 1 | 20 | 10 | 13 | 5 | 12 | 12 | 12 | 14 | 22 | 1 |
| Packet 2 |  | 10 | 13 | 5 | 12 | 12 | 12 | 14 | 22 | 1 |

| | ΔT 11 | ΔT 12 | ΔT 13 | ΔT 14 | ΔT 15 | ΔT 16 | ΔT 17 | ΔT 18 | ΔT 19 |
|---|---|---|---|---|---|---|---|---|---|
| Packet 1 | 1 | 1 | 1 | 1 | 1 | 12 | 14 | 26 |  |
| Packet 2 | 1 | 1 | 1 | 1 | 1 | 12 | 14 | 26 | 23 |

In FIG. 5, each packet contains information about the most recent quantity interval 503, 514, 535 as well as data about previous intervals 501, 502, 512, 513, 523, 524. The historical data provides redundancy and protects against data loss in the event that some packets are not received.

If the quantity interval is not closed within a set period of time, for example within 4 hours, the packet can be automatically closed and sent. This feature, in some embodiments, allows the collecting system to know that the meter reading device is still perating during prolonged periods of low or no usage. For example, when the consumer goes on a multi-day vacation and the commodity is not used much, the meter module will still send packets letting the collection system know that the meter-reading module and meter are still operating properly.

The prior art time-increment based methods, illustrated in FIGS. 2 and 3, provide highly redundant moving information. For example, packets are sent even if there is no consumption activity. This has serious consequences for the battery-operated devices, creates RF traffic with potential for collisions and loss of data or reduction of performance, increases the amount of data transmitted, and requires a significant amount of processing power and memory space for data storage, post-processing and archiving.

Richer Information Content

The quantity-interval based embodiments of the present invention can be viewed as an optimized way of capturing, recording, and/or transmitting consumption information. Certain embodiments provide a natural compression of consumption data because during periods of small or low usage very little data is transmitted. As a result, less data is required to convey the same level of accuracy with respect to the consumer's consumption as compared to prior art time-interval based techniques. This allows systems to either reduce costs by reducing the amount of data that is collected, recorded, and transmitted or to improve accuracy using the present amount of data and without increasing costs.

Figure 7:
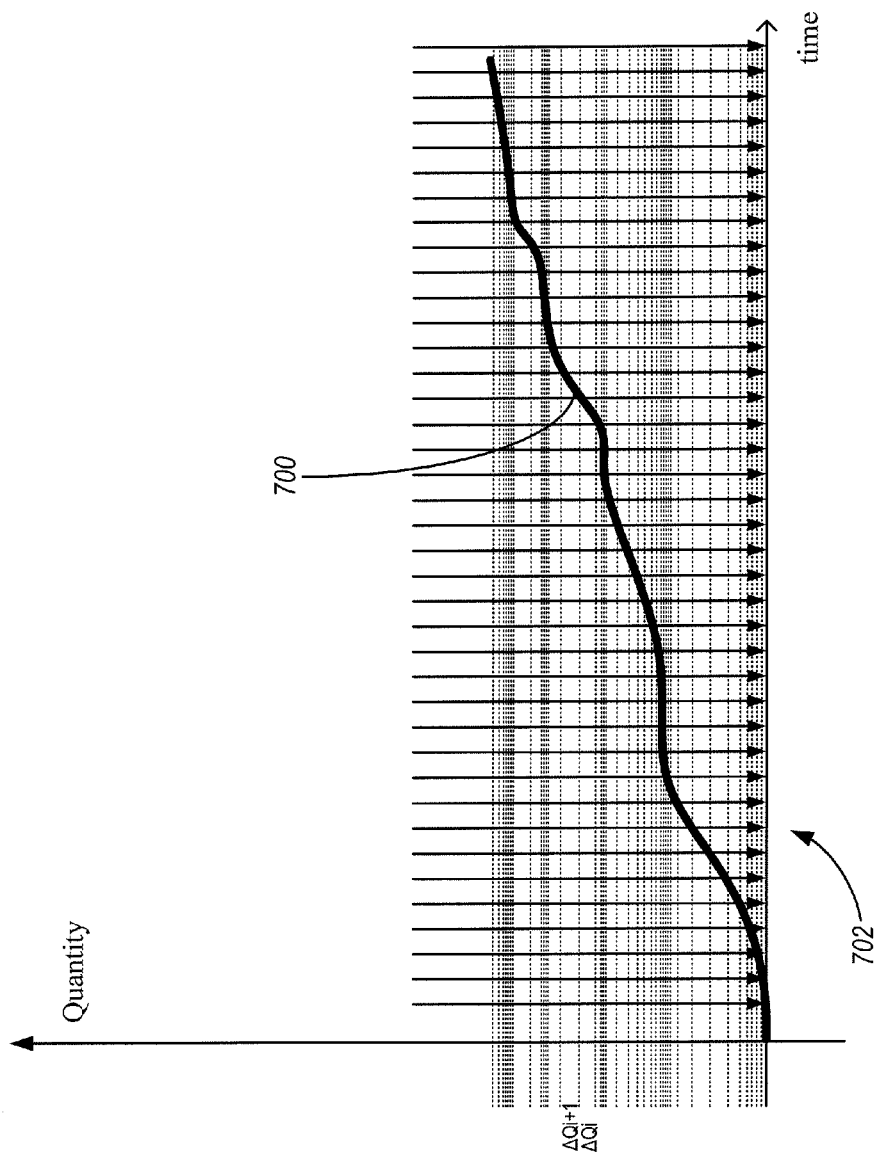
FIG. 7 illustrates a graph showing prior art data collection based on time step intervals.
Figure 8:
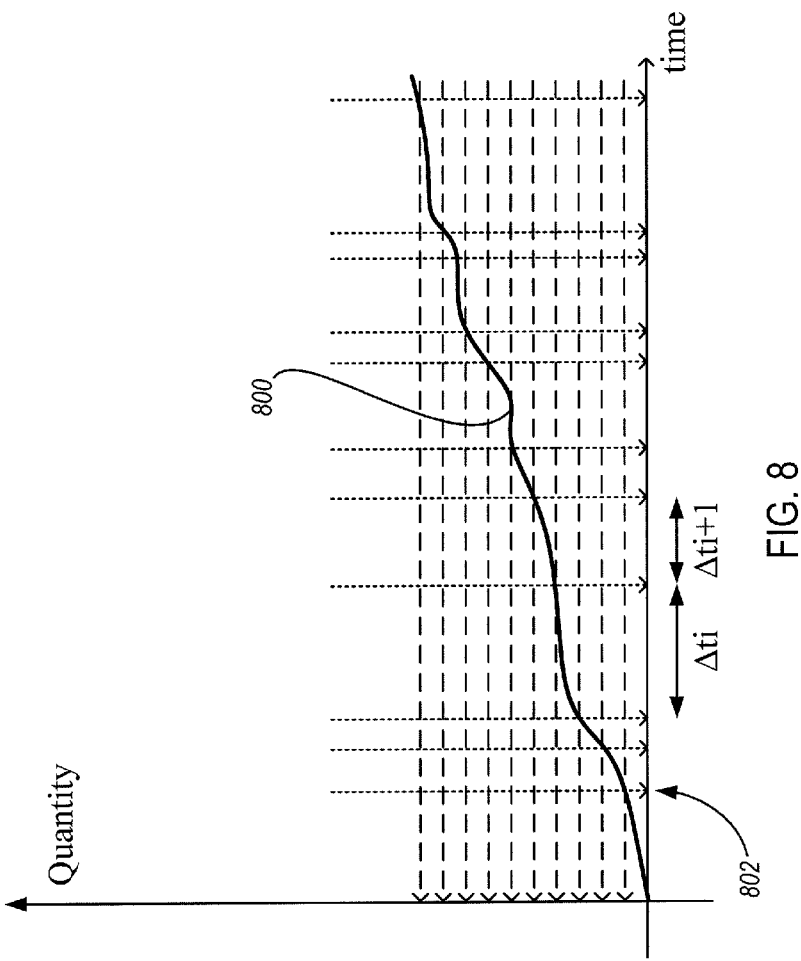
FIG. 8 illustrates a graph showing data collection based on count step intervals according to one embodiment of the present invention.

FIGS. 7 and 8 illustrate the reduced amount of data required when using a quantity based data collection technique as opposed to a time-interval based data collection technique. FIG. 7 shows a quantity versus time graph for a typical commodity consumption 700 over time. Arrows 702 represent data collected at set time-based intervals. FIG. 8 illustrates the same quantity versus time graph for the same commodity consumption 800 over time. However, data is only collected on count step or quantity-based intervals resulting in fewer data collections 802.

Savings in Memory and Transmission Efficiency

Another advantage is that memory will be used only when there is new information to store. In current time-increment based systems, a new interval is captured and stored even if there has been no change, even if none of the commodity has been consumed. In embodiments of the present invention, fewer data elements will be collected and recorded. This optimizes memory usage by avoiding unnecessary use of memory. The volume of data transmission is also reduced because of the reduced amount of data. Data moved from the intermediate levels of concentration upwards are also optimized in the same sense. The typical amount of data transmitted and stored at every step is reduced because only changes are recorded.

Battery Drain/Gas and Water Meters

Remote reading and transmitting devices have significant difficulties in applications with gas and water meters because such devices do not have a readily available electrical source. Accordingly, these systems are typically battery operated and consequently have very limited capabilities. The present system is advantageous because the reduction in collection and transmission operations uses less of the valuable battery power. The battery can last longer making consumption profiling meter reading a more viable option for non-electrical commodities.

Reduced Packet Success Rate (PSR) Requirements

Figure 6:
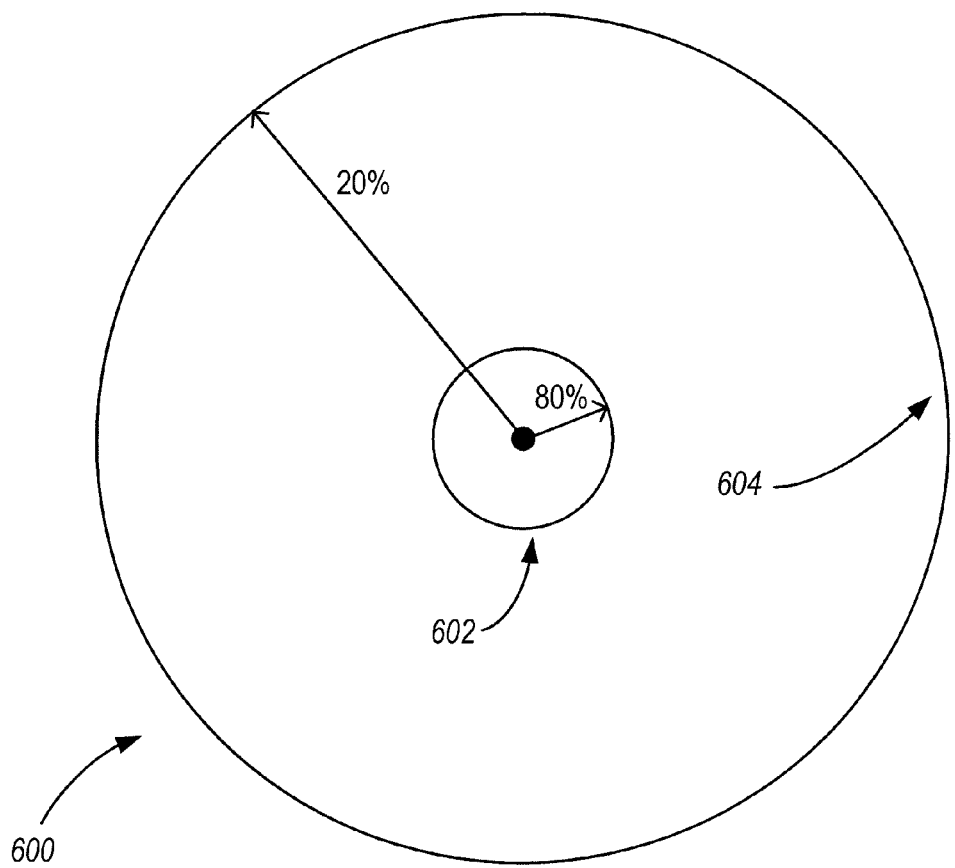
FIG. 6 illustrates a graph showing data collection ranges for a radio frequency based collection system.

The need for a high packet success rate ("PSR") is reduced through use of various embodiments of the present invention. This allows an increase in the deployed radius of network equipment, as shown in FIG. 6, and this may correspond to a reduction in the amount of network equipment needed to collect information over a given area.

These advantages are created because of the effective increase in the average time between packets from a given transmission device. Because the data collected is richer, less data is required to provide the desired consumption information. The reduced amount of data means that each packet of quantity interval based data will contain information about consumption over a much longer period of time (on average) than each packet of time interval based data.

For example, for a daily profile on a time increment based system with n=18 and time interval=2.5 minutes, 32 packets of time based increments of consumption data may be required. In other words, 32 packets of back-to-back data are required to assure that enough data has been received to accurately represent consumption over the day. Statistically, this will require a packet success rate of approximately 80% or better. Alternatively, in a quantity-based increment system, only 3 packets (each with 18 increments) of back-to-back data will be required to accurately represent consumption over the day even if above average consumption is assumed. This corresponds to requiring around a 20% PSR.

The reduced demand for packet success rates allows the transmission system to operate with fewer collection centers. FIG. 6 illustrates the increased range available to a collection device. As shown, the 80% PSR range 602 is significantly smaller in size that the 20% PSR range 604, which may be many times as large. Alternatively, the reduced PSR requirement allows the use of reduced strength transmission components. In most cases, the reduced PSR requirements will result in some sort of economic advantage through a reduced number of transmission components or reduced component strength. It also allows remote transmission components to be used in remote areas were it was previously not economically feasible.

The reduced number of transmissions also improves the packet success rate itself. Because there are fewer transmission, there are fewer collisions. Collisions reduce packet success rate and, accordingly, reducing collisions increases the overall PSR.

Pattern of Consumption/Time-of-Use

One of the primary functions of a network for energy collection is the ability to capture data across the system for the purpose of establishing patterns of consumption. One type of pattern of consumption information, time-of-use information, may be used to charge consumers at different rates depending on the time of day that the commodity offered by the utility company is consumed. Typically, a utility company will have 5 or 6 different periods or windows during the day, each window having a different rate.

The requirement of having well-defined time windows in time-of-use applications places limitations on the resolutions that may be used in consumption data techniques. In time-increment based techniques, the time increments must be aligned with the boundaries of the time windows. In order to reduce the margin of error, the time increments must be kept relatively small. This has lead to the use of 2.5 minute intervals in many systems, since such an interval avoids realigning of more than 1.25 minutes around the time window boundaries. Moreover, time-interval based applications require additional resources so that each packet of consumption data can be accurately referenced to a precise time boundary to show when the information was sampled from the meter. Additional information must be conveyed with every packet identifying the difference between the data capture time and the data transmission time. These features require additional processing and memory because each packet of data has to be referenced to an absolute and precise time.

The quantity-interval based techniques of the present invention allow for consumption profile reconstruction based on fixed steps of the quantity being measured and information about the time when such steps are reached. The problem of time alignment is approached in a different way and many of the problems associated with a time-interval based approach are avoided. The resolution of the quantity increment can be set so that the resolution is as good or better than the billing resolution. Regardless of the size of the consumption during the time window, the error is never worse than a single quantity increment.

Under the quantity-increment based techniques of the present invention, any time boundary will always lie between two consumption boundaries. The best estimate of a time boundary will occur whenever the two consumption boundaries are known, because the two times at which the consumption boundaries were reached are then known. Knowing that any time boundary lies between two successive consumption values means that estimating the consumption at that time boundary, which is the only meaningful quantity for time-of-use purposes, will be as accurate as the quantity interval or consumption step that was used to collect the data.

Typically, for example in the electric metering application, if one uses 1 kilowatt-hour as the quantity interval, then consumption at any time boundary will be known with an accuracy of 1 kilowatt-hour. This means that the time-of-use value will be represented correctly with the accuracy of that interval quantity and the time alignment error becomes irrelevant. As long as the resolution required by the time-of-use service is compatible with the quantity selected, then the time-of-use service will be provided within that resolution. Every time-based quantity (demand, rolling demand, load profile, system load snapshot, etc.) will benefit from time-alignment error being irrelevant.

Randomization not Necessary

Another advantage to quantity interval based techniques over time increment based techniques is that randomization in the communication device may not be necessary. In the quantity interval based techniques the different values of the quantity counters for different meters will ensure a completely random access of packets to the communication channel.

In contrast, randomization was required as a separate step in many prior art time increment based techniques. The transmissions are randomized in these techniques to avoid packet transmission collisions. This often required that a separate randomization module be implemented at each meter device. In many time increment based prior art techniques, if there is a power outage, many meter reading modules will come back on and try to send packets at the same time. To address this issue, a randomizer is typically employed at each module that randomizes the time that each packet is transmitted. Usually, transmission is delayed for a random time period and the value of that time period is added to the packet so that the concentrator receiving that packet can determine when the interval occurred when the usage data was recorded. Such randomization components and techniques are not necessary in the present invention because transmissions are naturally randomized by the random usage of different consumers.

Flags and Power Outage Notification

Flags and power outage notifications can be considered independent events and either added to the packets or transmitted as independent communications. One difficult function to build, verify and get working properly in time-interval based techniques is the marking of time discontinuity across a power outage. The quantity-interval based techniques of the present invention avoid many of the common problems because the count or interval information freezes with the power outage. No information is lost. The consumption profile can be recorded completely accurately.

Electric Endpoint Example

The methods and systems of the present invention have many potential applications with utility systems. As an example, a quantity-interval based reading device could be installed at an electric meter at a consumer's residence. As the consumer uses electricity, the electric meter's dial spins, tracking the amount of electricity being consumed. The installed quantity-based reading device reads information from the spinning dial. Specifically, once installed the reading device monitors the meter's dial for the completion of each additional count-step. In this example, the count step is 1 kilowatt-hour. Thus, after one kilowatt-hour has passed on the dial, the reading device stores the total amount in memory. At this point the total amount is 1 kilowatt-hour. The reading device continues to monitor the consumer's consumption of electricity. When each additional increment of electricity or kilowatt-hour is consumed, the reading device records the event by storing the total amount in memory. Thus, after the second kilowatt-hour is consumed a "2" is stored, after the third is consumed a "3" is stored, etc. In this way the reading device always has stored in memory a value for the total amount of energy consumed that is within 1 kilowatt-hour of the actual amount consumed. Each of the entries stored in memory could also include a reference to the time of the event. In this way, the memory would contain a historical record based on consumption intervals rather than time intervals.

The reading device may periodically transmit the stored consumption data to a collection system. For example, the data is sent via an Internet connection every 5 quantity-increments. In other words, data will be transmitted after 5 kilowatt-hours, after 10 kilowatt-hours, after 15 kilowatts, etc. The data received at the collection system collection point is used for billing and time of use statistical analysis. Many variations and alterations to the above example are of course possible.

Embodiments of the present invention can be used in a standard electromechanical residential meter with a quantity interval of 1 kilowatt-hour. This would provide acceptable information even for a household that consumes a well-above-average amount of 2400 kilowatt-hours per month during periods of high consumption. There would be approximately 80 transmissions necessary on the average day based on this assumed consumption level. This represents slightly more than a 15 minute average between any two data captures, which is six times less often data capture and three times fewer data transmissions than a time-increment based system that transmits every five minutes.

Forming intervals of time between each kilowatt-hour, it will take an average of about 16 minutes (1000/60 minutes) to complete each kilowatt interval and there would be 18 such intervals in each packet for an average total of 248 (16*18) minutes consumption information per packet, or the equivalent of about 4 hours. Accordingly, on average it is necessary to receive only one packet every four hours to ensure data continuity or six packets required per day. Data continuity allows a correct reproduction of the consumption profile for the meter.

In contrast, a 2.5 minute, 18 interval time-increment approach has only 45 minutes of information in each packet and requires a minimum of 32 packets per day to complete the same profile. The radiofrequency transmission requirements are accordingly significantly less under a quantity-based approach.

Also, note that the consumption assumptions in the example are not for average consumption but rather representative of the above average case of higher consumption periods. The less the consumption, the more efficient the quantity-interval based techniques operate. For example, a typical residential meter may have an average of 900 kilowatt-hour (or less) of monthly consumption over the year. At this consumption rate, it will take an average of 3000 seconds to complete 1 kilowatt-hour and 28 such events will happen in a day. It will take an average of about 50 minutes to complete each kilowatt-hour interval, so each interval will carry about 50 minutes of new information, and each packet will contain about 900 (50*18) minutes of redundancy. This is the equivalent of 15 hours of memory on each packet. It would be necessary to receive a little less than two packets per day to ensure correct reproduction of the daily consumption pattern.

The quantity-interval based techniques also allow the demand resolution to be refined as the demand increases. This is particularly useful in high-end meter applications. While the amounts of energy to be measured by these meters may be higher than the residential ones, in many cases the meter will come with a multiplier, reducing by that amount the required dynamic range.

Alternative Embodiments

The structures and processes described above illustrate exemplary embodiments of inventive concepts included in the present invention. Other systems and processes are possible. While the invention has been described in detail with particular references to these particular embodiments, variations and modifications can be affected within the spirit and scope of the invention as described in this document. For example, the techniques of the present invention may also be used with encoders and serial connections. Nothing in this specification is meant to limit, expressly or implicitly, the plain meaning of the terms used in the following claims.

That which is claimed:

1. A data collection system comprising:
   a collector having a receiver configured to receive data; and
   a plurality of sensors each of which is configured to determine an elapsed time between successive measurements of a predetermined quantity of a consumable commodity and send data comprising the elapsed time to the collector.

2. The system of claim 1, wherein the data sent by one or more of said plurality of sensors is transmitted by wireless radio frequency signal.

3. The system of claim 1, wherein said sensor sends said elapsed time to said collector for each measurement of said predetermined quantity.

4. The system of claim 1, wherein said sensor sends said elapsed time to said collector at intervals of the predetermined quantity.

5. A data collection system for the collection of data from a plurality of commodity meters comprising:
   a) a plurality of telemetry devices, each of the plurality of telemetry devices being associated with at least one selected meter, each telemetry device including;
      i) a sensor to successively measure a predetermined amount of a parameter from said meter,
      ii) a timer to measure the elapsed rime between each successive measurement of said predetermined amount said parameter;
      iii) a first memory configured to store said elapsed times, and
      iv) a sending module for sending a packet of a plurality of said stored elapsed times, the packet including an address unique to a certain telemetry device; and
   b) a plurality of collection devices located remote from said telemetry devices for receiving the packet.

6. The system of claim 5 wherein the sending module consists of a wireless transmitter for transmitting said packet by a wireless signal for each measurement of a predetermined amount of said parameter.

7. A radio communication network for communicating information comprising a plurality of remote data generating stations, each of the remote stations having means for generating data for transmission, control means for modulating the data for transmission on a radio frequency carrier and arranged to form said data into a packet of data and to transmit said data upon each successive measurement of a predetermined amount of a consumable commodity.

8. A method of collecting data related to a metered commodity comprising the steps of:
   successively measuring a predetermined amount of said metered commodity;
   measuring the elapsed time between each successive measurement of said predetermined amount of said metered commodity; and
   storing said elapsed time in a telemetry device.

9. The method of claim 8 further comprising transmitting by wireless signal said stored elapsed time to at least one collection device for each measurement of said predetermined amount of said metered commodity.

10. The method of claim 9 further comprising storing a plurality of elapsed times in said telemetry device.

11. The method of claim 10 further comprising:
extracting a series of elapsed times from said transmitted wireless signals; and
analyzing said series of elapsed times to generate a rate of use of said metered commodity.

12. A method of collecting commodity usage data comprising:
monitoring usage of a commodity at a utility meter;
determining the time that elapsed between the measurement of one or more set quantity intervals based on the usage monitored at the meter; and
recording data, wherein the data is based on the time elapsed during the one or more set quantity intervals.

13. The method of claim 12 wherein the data comprises the elapsed time.

14. The method of claim 12 further comprising transmitting the elapsed time associated with the most recent quantity interval along with one or more elapsed times associated with one or more previous quantity intervals.

15. The method of claim 12 further comprising transmitting one or more of the elapsed rime intervals at transmission intervals based on the quantity intervals.

16. The method of claim 12 wherein the one or more elapsed time intervals are transmitted to a remote collection system.

17. The method of claim 16 further comprising transmitting a meter ID to the remote collection system.

18. The method of claim 17 wherein the one or more elapsed time intervals and the Meter ID are transmitted together over a packet based transmission system.

19. The method of claim 12 wherein measured quantity data is also recorded after a predetermined maximum time interval has passed.

20. A utility meter data collection system comprising:
a meter-reading device configured to record data associated with intervals, wherein the lengths of the intervals are based at least in part on the quantity of the commodity that is consumed and the data comprises a determined elapsed time for one or more of the intervals, and the meter reading device is configured to send the data to a concentrator; and
a concentrator for collecting data from the meter-reading device.

21. The system of claim 20 wherein the determined elapsed time is the change in time that occurs while a set quantity of the utility is consumed.

22. The system of claim 20 wherein the meter-reading device is configured to send data about previous quantity intervals with data about the current quantity interval.

23. The system of claim 20 wherein the data transmitted to the collection system comprises a meter ID associated with the meter and information about the change in time that occurs while the set quantity of the commodity is consumed.

24. The system of claim 20 wherein the data is transmitted in a packet over a packet based transmission system.

25. The system of claim 20 wherein the lengths of the intervals are also based at least in part on whether a predetermined maximum time interval has passed without a set quantity of the commodity being consumed.

26. A method of constructing a consumer commodity consumption profile comprising:
recording data about a series of set quantity intervals at a utility meter;
determining the time that elapsed during each of the intervals; and
constructing a consumer commodity consumption profile using the elapsed times for the series of intervals.

27. The method of claim 25 further comprising using the profile for analysis.

28. The method of claim 25 further comprising using the profile for billing.

29. The method of claim 25 further comprising using the profile to generate statistics regarding consumer usage patterns.

30. The method of claim 25 further comprising using the profile to allow billing a consumer based on time of use.

31. The method of claim 25 further comprising using the profile to allow statistical analysis of consumer time of use.

32. The method of claim 12 wherein determining the time that elapsed occurs at the utility meter.

33. The method of claim 12 wherein determining the time that elapsed occurs at a concentrator separate from the utility meter.

34. The data collection system of claim 1 wherein each sensor is further configured to send data comprising a relatively-current total absolute value of utility consumed.

35. The data collection system of claim 5, wherein the sending module of each telemetry device is configured to send data comprising a relatively-current total absolute value of utility consumed.

36. The data collection system of claim 35, wherein each packet of stored elapsed times further comprises the absolute value data.

37. The radio communication network of claim 7, wherein each packet of data arranged by the control means further comprises a relatively-current total absolute value of utility consumed.

38. The method of claim 12 further comprising transmitting a relatively-current total absolute value of utility consumed along with one or more elapsed times.

39. The utility meter data collection system of claim 20, wherein the meter reading device is configured to send to the concentrator data comprising a relatively-current total absolute value of utility consumed.

40. The method of claim 26, wherein constructing the consumer commodity consumption profile further comprises using a relatively-current total absolute value of utility consumed.

41. The method of claim 12 further comprising storing the data at the utility meter.

* * * * *

UNITED STATES PATENT AND TRADEMARK OFFICE
CERTIFICATE OF CORRECTION

PATENT NO. : 7,301,475 B2 Page 1 of 1
APPLICATION NO. : 11/110075
DATED : November 27, 2007
INVENTOR(S) : Ruben E. Salazar Cardozo It is certified that error appears in the above-identified patent and that said Letters Patent is hereby corrected as shown below:

Title Page;
Under Assignee (73) -

In line 1, please change "Callnet" to --Cellnet--

Signed and Sealed this

Fifteenth Day of April, 2008

JON W. DUDAS
*Director of the United States Patent and Trademark Office*